United States Patent [19]
Voit

[11] Patent Number: 5,397,554
[45] Date of Patent: Mar. 14, 1995

[54] PROCESS OF HYDROLYZING A GROUP IVB METAL CHLORIDES

[75] Inventor: Donald O. Voit, Ogden, Utah

[73] Assignee: Westinghouse Electric Corporation, Pittsburgh, Pa.

[21] Appl. No.: 196,884

[22] Filed: Feb. 15, 1994

Related U.S. Application Data

[63] Continuation of Ser. No. 974,374, Nov. 10, 1992, abandoned, which is a continuation of Ser. No. 808,043, Dec. 12, 1991, abandoned, which is a continuation of Ser. No. 603,344, Oct. 26, 1990, abandoned.

[51] Int. Cl.$^6$ .................... C01B 11/00; C01G 23/00; C01G 25/00; C01G 27/00
[52] U.S. Cl. ........................... 423/82; 423/85; 423/472
[58] Field of Search .................. 423/82, 85, 610, 611, 423/612, 472; 106/436, 437, 438

[56] References Cited

U.S. PATENT DOCUMENTS

| | | | |
|---|---|---|---|
| 2,942,944 | 6/1960 | Wilhelm et al. | 423/472 |
| 3,032,388 | 5/1962 | McCord et al. | 423/70 |
| 3,057,678 | 10/1962 | Clearfield | 423/472 |
| 3,058,801 | 11/1962 | Pilloton | 423/85 |
| 3,375,070 | 3/1968 | Krings et al. | 423/472 |
| 3,425,796 | 2/1969 | Bauer | 423/472 |
| 3,471,252 | 11/1969 | Sugahara et al. | 423/69 |
| 3,492,085 | 1/1970 | Sugahara et al. | 423/492 |
| 3,914,381 | 11/1975 | Sugahara et al. | 423/71 |
| 4,256,463 | 3/1981 | Carter | 423/82 |
| 4,923,682 | 5/1990 | Roberts et al. | 423/611 |
| 4,944,936 | 7/1990 | Lawhorne | 423/612 |
| 5,011,674 | 4/1991 | Yoshimoto et al. | 423/612 |

FOREIGN PATENT DOCUMENTS 465605  5/1937  United Kingdom ............... 423/472

OTHER PUBLICATIONS

Perry's Chemical Engineer's Handbook, 5th Edition, pp. 19-17, 1973.

*Primary Examiner*—Gary P. Straub
*Assistant Examiner*—Steven Bos

[57] ABSTRACT

Hydrolyzing finely divided, solid Group IVB metal chlorides by gradually introducing the finely divided solids into the mixing zone of a high intensity mixer operating on an aqueous solution produces solid Group IVB metal oxy salts such as $ZrOCl_2 \cdot 8H_2O$.

18 Claims, 1 Drawing Sheet

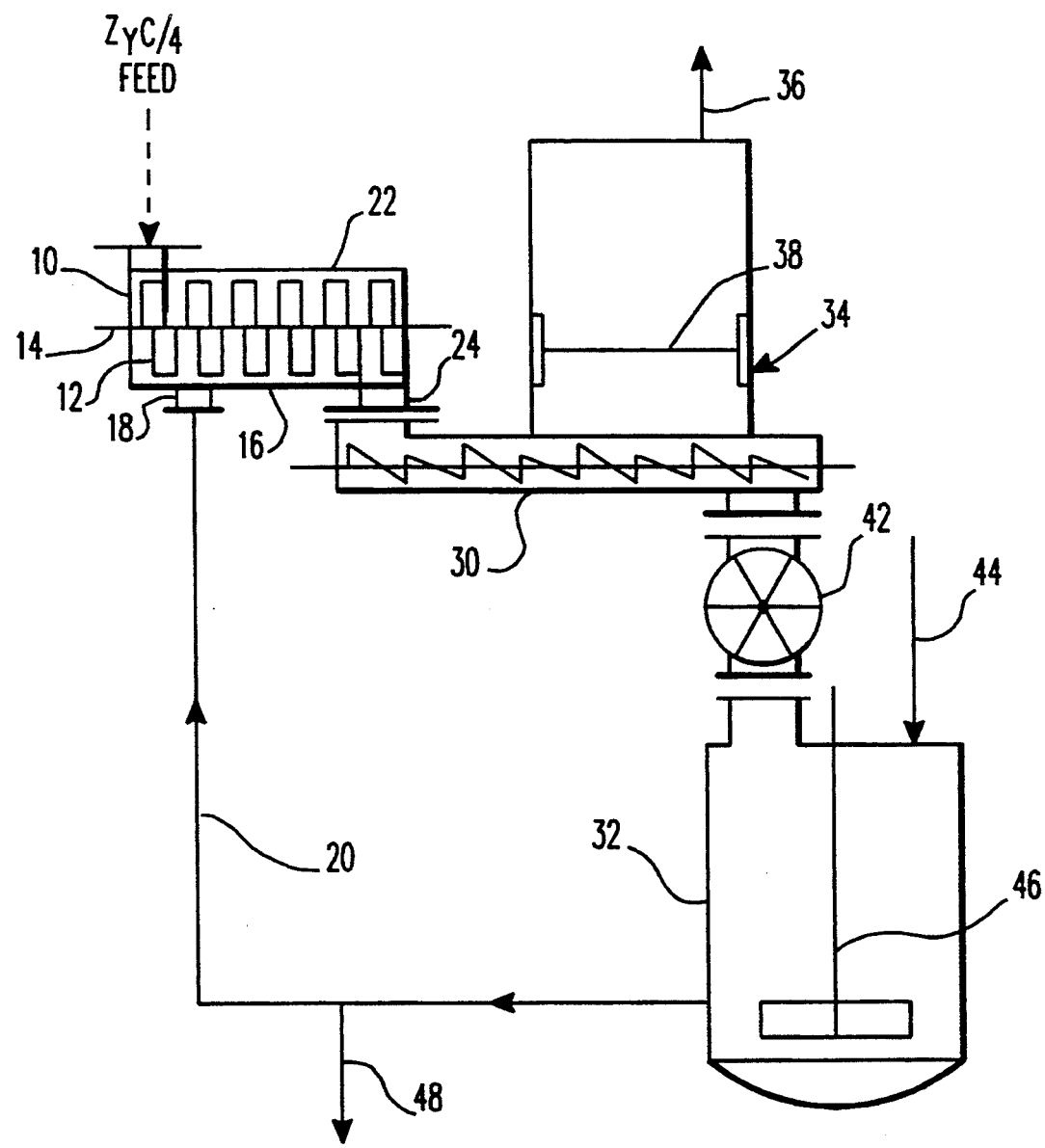

PROCESS OF HYDROLYZING A GROUP IVB METAL CHLORIDES

This application is a continuation of application Ser. No. 07/974,374, filed Nov. 10, 1992, now abandoned, which is a continuation of Ser. No. 07/808,043, filed Dec. 12, 1991, now abandoned, which is a continuation of Ser. No. 07/603,344, filed Oct. 26, 1990, now abandoned.

BACKGROUND OF THE INVENTION

1. Field of the Invention

The invention is in the field of processes for hydrolyzing Group IVB metal chlorides including titanium chloride ($TiCl_4$), zirconium chloride ($ZrCl_4$) and hafnium chloride ($HfCl_4$). It is particularly useful in hydrolyzing zirconium chloride, often spoken of as zirconium tetrachloride, and will be described principally in this context.

2. Description of the Prior Art

Zirconium tetrachloride has been converted to zirconium oxychloride ($ZrOCl_2.8H_2O$) in the laboratory by simply pouring water into a breaker of $ZrCl_4$. However, the water tends to form dense agglomerates at the points of contact, leaving unreacted material where there is no contact. The result is a hard mass containing unreacted material. Moreover, the reaction is violent involving considerable heat, hydrochloride acid fumes, and zirconium chloride dust.

Although many different processes have been tried, none have been used commercially for one reason or another such as low concentration of HCl recovered and corrosion problems for materials used in plant construction.

SUMMARY OF THE INVENTION

It has been realized that significant advantages would result in the production of nuclear grade zirconium metal by using a feed of zirconium oxychloride instead of the usual zirconium tetrachloride. For example, much higher zirconium concentrations are possible with an oxychloride feed, permitting major reductions in the size of processing equipment and use of higher efficiency pulse columns. In addition, there is a reduction in generation of toxic wastes.

Accordingly, a commercial process for producing a hydrolyzed Group IVB metal salt such as zirconium oxychloride is a highly desirable objective of the invention.

The invention broadly resides in a process for hydrolyzing a Group IVB metal chloride by gradually introducing $TiCl_4$, $ZrCl_4$ and/or $HfCl_4$ solids into the mixing zone of a high intensity mixer and then mixing an aqueous solution with the Group IVB metal chloride to produce a solid hydrolyzed Group IVB metal oxy salt such as zirconium oxychloride (zirconyl chloride), titanium oxychloride, hafnium oxychloride, zirconyl sulfate, titanyl sulfate and the like. Preferably the hydrolyzed salt has a volatility substantially less than the volatility of HCL. The solutions may in certain practices of the invention comprise HCl, $H_2SO_4$, HF, $HNO_3$, $HClO_4$, $CH_3COOH$ and mixtures thereof. Also, the aqueous solution may be a recycle product stream. Thus, in the production of zirconium oxychloride, the aqueous solution may be a recycle stream comprising dissolved zirconium oxychloride.

According to the invention, finely divided zirconium tetrachloride solids, granules or powder, are hydrolyzed by mixing such solids with an aqueous zirconium oxychloride solution in a high intensity mixing reactor to produce solid zirconium oxychloride with a nominal Cl to Zr ratio in a range between about 2.0 and about 3.0 having a hydration number of 4 or 5, and hydrochloric acid vapor having a molar ratio of $H_2O$ to HCl in the range of about 0.5 to about 2.

The ratio of liquid reactants to the $ZrCl_4$ is critical. It must not be such as to produce a hydration number greater than 6. Otherwise, the product will be a sticky paste that will plug the system. With a hydration number below 4, the reaction is incomplete resulting in loss of HCl. It is also critical that the feed to the mixing reactor be directly into its turbulent mixing zone, so $ZrCl_4$ powder will not stick together.

BRIEF DESCRIPTION OF THE DRAWING

The invention will become more readily apparent from the following description of the best mode of practice shown, by way of example only, in the accompanying flow diagram of a process for hydrolyzing $ZrCl_4$ to produce $ZrOCl_2.8H2O$.

DETAILED DESCRIPTION OF THE BEST MODE

The best mode presently contemplated for carrying out the invention in commercial practice is to use a high intensity mixing reactor such as a "Bepex Turbulizer" manufactured by the Bepex Corporation of Minneapolis, Minn. to produce zirconium oxychloride (zirconyl chloride). Other mixing reactors may, of course, be used so long as they are of sufficiently high intensity to accomplish thorough wetting of the solids under highly turbulent mixing conditions and are constructed of materials capable of withstanding the highly corrosive conditions. Also other Group IVB metal basic salts may be produced in high intensity mixers.

Several series of laboratory tests carried out in a Cuisinart Food Processor and of pilot plant tests carried out in a Bepex 8" Clam Shell Turbulizer have shown the process of the invention to be feasible and to be best carried out by reacting finely divided zirconium tetrachloride solids with an aqueous solution of zirconium oxychloride to produce a flowable, solid, hydrolyzed zirconium oxychloride having a Cl to Zr ratio of approximately 2 to 3 and a hydration number (n) between 4 and 5 in the formula $ZrO Cl_2.nH_2O$. The heat of reaction was shown to raise the temperature of the product from ambient to about 80° C., with the released chloride forming a wet HCl vapor having a molar ratio of water to HCl of between 1 and 2. The tetrachloride powder was introduced gradually into the highly agitated mixing zone of the mixer during operation thereof.

Intense agitation in the reaction zone was provided by blades of the mixer rotating at approximately 1100 rpm and served to effectively homogenize the reaction product. Although oxychloride solids tend to build up on the walls of the mixer, they were constantly scraped off by the rotating blades. The resulting product was granular with powder. The pilot plant tests produced about 10,000 pounds of product.

The accompanying process flow diagram illustrates a preferred practice of the present invention wherein finely divided zirconium chloride solids are continuously introduced into a paddle-type high intensity mixer 10, such as a Bepex Turbulizer, having a plurality of paddle-type blades 12 mounted on a rotatable shaft 14. Based upon the above-described pilot plant tests, the solids may be fed to paddle-type mixers at mass flow rates of up to about 2000-30000 pounds/hr per square foot of cross sectional mixer area or more and the paddle-type blades 12 may be effectively operated at tip speeds of up to about 20-40 feet/second or more. Most preferably the solid feed rate is at least about 3,000 pounds/hr/sq. ft. and the tip speed of the blades is at least about 40 feet/second. The residence time in the mixer 10 may be controlled by the pitch of the blades 12. In addition, the pitch may be varied so that, e.g., the upstream blades 12 advance the solids while the downstream blades 12 mix the solids and the solution together. Other high intensity conditions or other high intensity mixers which effectively wet and homogenize the reaction products and (at least for a continuous process) scrape the mixer walls 16 may be alternatively employed. An aqueous zirconium oxychloride solution is introduced into the mixer 10 through one or more nozzles 18. Preferably the aqueous solution is a product stream which is recycled to the mixer 10 via a recycle line 20. As the solid feed and recycle solution flow through the mixing zone 22 of the mixer 10, they react to produce a hydrolyzed zirconium oxychloride solid having a Cl to Zr ratio of approximately 2 to 3 and a hydration number between 4 and 5.

As the flow diagram shows the Bepex turbulizer has a horizontally oriented shaft 14. In other embodiments, the shaft 14 may be vertically oriented. Such an arrangement advantageously limits the upstream flow of solution toward the solids inlet which might plug the inlet.

The reaction products flow from an outlet nozzle 24 in the mixer 10 as generally granular solids including a variable amount of dust particles into a screw conveyor 30 or other suitable means for transporting the solids to a digester such as a digestion tank 32. Preferably, the conveyor 30 has a gas space which permits wet hydrochloric acid vapors to separate from the solids and permits at least the larger entrained dust particles to settle back into the solids. The conveyor 32 may be water-jacketed (not shown) to cool the solids and may employ water sprays (not shown) to knock down the dust and to trim the moisture content of the solids. A ribbon blender may advantageously be employed in place of a screw conveyor. If the solution is overfed to the solids, the solids may develop a putty-like consistency and may plug the system. A ribbon blender would mix fresh feed into a plug to correct the upset.

Most preferably, the conveyor 30 transports the solids through a bag house 34 for separating the wet hydrochloric acid vapors from the solids. The vapors may be vented through a line 36 to a scrubber (not shown) for generating a hydrochloric acid solution. The bag house 34 preferably employs one or more bags 38 to filter 1 micron particles from the vapors, which may include up to about 20% air. The 1 micron and larger particles are returned to the zirconium oxychloride stream. The solids are fed to the digestion tank 32 by a rotary feeder 42 or other suitable feeding device. A rotary-type feeder advantageously restricts air flow into the bag house 34 from the tank 32. The solids dissolve in additional water which is pumped to the tank 32 through line 44. The solids and water are circulated by an agitator 46 in the tank 32 at temperatures of up to about 100° C. The dissolved zirconium oxychloride solution is pumped through line 48 to a process hold tank for further processing or is recycled through line 20 to the mixer 10.

$ZrCl_4$ may also be hydrolyzed with other aqueous solutions (which may be recycle streams) containing $H_2SO_4$, HF, $HNO_3$, $HClO_4$ and $CH_3COOH$ to produce hydrolyzed $ZrOSO_4$, $ZrOF_2$, $ZrO(NO_3)_2$, $Zr(ClO_4)_2$ and $ZrO(CH_3COO)_2$, respectively. Other aqueous solutions may be employed but, preferably, the zirconyl salt has a volatility substantially less than the volatility of HCl. $TiCl_4$ and $HfCl_4$ may be similarly processed.

Whereas this invention is here illustrated and described with specific reference to an embodiment thereof presently contemplated as the best mode of carrying out such invention in actual practice, it is to be understood that various changes may be made in adapting in the invention to different embodiments without departing from the broader inventive concepts disclosed herein and comprehended by the claims that follow.

What is claimed is:

1. A process for hydrolyzing a Group IVB metal chloride to produce a metal oxy salt having a hydration number no greater than 6 in the course of the hydrolysis, comprising the steps of:

continuously introducing Group IVB metal chloride solids into the mixing zone of a mixer;

mixing 6 moles or less of water per mole of the Group IVB metal chloride solids water with the solids in the mixer having mixing blades, with said mixing blades rotating at a tip speed of at least about 20 feet per second to produce in the mixer a flowable granular hydrolyzed Group IVB metal oxy salt having a hydration number of no greater than 6; and flowing the Group IVB metal oxy salt having a hydration number of no greater than 6 from the mixer.

2. The process of claim 1, wherein zirconium chloride solids are introduced into the mixer.

3. The process of claim 1, wherein titanium chloride solids are introduced into the mixer.

4. The process of claim 1, wherein hafnium chloride solids are introduced into the mixer.

5. The process of claim 1, wherein the water mixed with the Group IVB metal chloride in the mixer is an aqueous solution comprising an acid selected from the group consisting of such acids as HCl, $H_2SO_4$, HF, $HNO_3$, $HClO_4$, and $CH_3COOH$.

6. The process of claim 1, wherein additional water is mixed with the Group IVB metal chloride to dissolve the solids.

7. The process of claim 6, comprising the additional step of:

transporting the solids from the high intensity mixer to a water-containing digester for dissolving the solids.

8. The process of claim 7, comprising the additional step of:

separating wet hydrochloric acid vapors having a HCl molar ratio of about 0.5 to about 2 from the solids produced in the high intensity mixer.

9. The process of claim 7, comprising the additional step of:

cooling the solids as they are transported from the high intensity mixer.

10. The process of claim 7, comprising the additional step of:

trimming the moisture content of the solids as they are transported from the high intensity mixer.

11. The process of claim 1, wherein an aqueous solution containing $H_2SO_4$ is mixed with the Group IVB metal chloride.

12. A process of hydrolyzing zirconium tetrachloride to produce a substantially free flowing, finely divided, solid zirconium oxychloride reaction product comprising reacting finely divided, solid zirconium tetrachloride with 6 moles or less of water per mole of zirconium tetrachloride, the water introduced as an aqueous solution of zirconium oxychloride, by continuously introducing said zirconium tetrachloride solids into the mixing zone of a mixer having mixing blades while rotating said mixing blades in the mixing zone at a tip speed of at least about 20 feet per second during operation of said mixer on said aqueous solution to agitate such solution within said mixing zone for producing in the mixer a zirconium oxychloride reaction product having a hydration number of from 4 to 6; and then flowing said reaction product from the mixer.

13. A process according to claim 12, wherein the mixer has mixing blades that rotate at approximately 1100 rpm during operation of the mixer.

14. A process according to claim 12, wherein a hydrochloric acid vapor is produced as a by-product of the process.

15. A process according to claim 14, wherein the hydrochloric acid vapor has a molar ratio of water to HCl of 1.0 to 2.0.

16. A process according to claim 12, wherein the Cl to Zr ratio of the zirconium oxychloride reaction product is within the range of from about 2.0 to about 3.0.

17. A process according to claim 16, wherein the hydration number of the zirconium oxychloride in aqueous solution is in the range of from 4 to 5.

18. A process for hydrolyzing a Group IVB metal chloride, comprising the steps of:
   introducing Group IVB metal chloride solids into the mixing zone of a mixer having mixing blades;
   rotating mixing blades in the mixer at a tip speed of at least about 20 feet per second;
   mixing 6 moles or less of water per mole of Group IVB metal chloride with the solids in the mixer to produce in the mixer a flowable solid partially hydrolyzed Group IVB metal oxy salt;
   transporting the partially hydrolyzed solids from the mixer;
   trimming the moisture content of a first portion of the partially hydrolyzed solids as they are transported from the mixer; and
   blending a second portion of the partially hydrolyzed solids from the mixer into the moisture-trimmed solids.

* * * * *